United States Patent
Winter et al.

(10) Patent No.: US 11,942,625 B2
(45) Date of Patent: Mar. 26, 2024

(54) METHOD FOR PRODUCING A HOMOGENIZED MIXTURE OF CARBON, SULFUR, AND PTFE

(71) Applicant: NETZSCH Trockenmahltechnik GmbH, Hanau (DE)

(72) Inventors: Frank Winter, Mühlheim (DE); Regina Dambach, Offenbach (DE)

(73) Assignee: NETZSCH Trockenmahltechnik GmbH, Hanau (DE)

( * ) Notice: Subject to any disclaimer, the term of this patent is extended or adjusted under 35 U.S.C. 154(b) by 0 days.

(21) Appl. No.: 17/455,053

(22) Filed: Nov. 16, 2021

(65) Prior Publication Data
US 2022/0166005 A1 May 26, 2022

(30) Foreign Application Priority Data
Nov. 25, 2020 (DE) .................... 10 2020 131 233.4

(51) Int. Cl.
*H01M 4/36* (2006.01)
*B02C 13/22* (2006.01)
(Continued)

(52) U.S. Cl.
CPC ............. *H01M 4/364* (2013.01); *B02C 21/00* (2013.01); *C08F 14/26* (2013.01); *C08K 3/04* (2013.01);
(Continued)

(58) Field of Classification Search
CPC .. H01M 4/133; H01M 4/1393; H01M 4/1397; H01M 4/362; H01M 4/364;
(Continued)

(56) References Cited

U.S. PATENT DOCUMENTS

| 4,915,987 A | * | 4/1990 | Nara | ....................... B01F 27/70 |
| | | | | 427/195 |
| 7,361,431 B2 | * | 4/2008 | Kim | .................... H01M 4/1397 |
| | | | | 429/213 |

(Continued)

FOREIGN PATENT DOCUMENTS

| CN | 101478061 A | * | 7/2009 | |
| CN | 105185965 A | * | 12/2015 | .............. H01M 4/13 |

(Continued)

OTHER PUBLICATIONS

Ji et al. ("A highly ordered nanostructured carbon-sulphur cathode for lithium-sulphur batteries," Nature Materials, vol. 8 , 2009, 500-506) (Year: 2009).*

(Continued)

*Primary Examiner* — Matthew R Diaz
(74) *Attorney, Agent, or Firm* — Whitmyer IP Group LLC

(57) ABSTRACT

A method for producing a homogenized mixture of carbon, sulfur, and PTFE, wherein the sulfur is liquefied, and the liquid sulfur is then ground for the first time together with the carbon, so that the liquid sulfur is absorbed by the pores of the carbon particles and forms a preferably powdery composite with the carbon particles, whereupon PTFE is added and the mixture of the composite and the PTFE is then ground a second time and is thus homogenized.

20 Claims, 2 Drawing Sheets

(51) Int. Cl.
  *B02C 21/00* (2006.01)
  *C08F 14/26* (2006.01)
  *C08K 3/04* (2006.01)
  *C08K 3/06* (2006.01)
  *H01M 4/587* (2010.01)
  *H01M 4/62* (2006.01)
  *H01M 10/052* (2010.01)

(52) U.S. Cl.
  CPC ............... *C08K 3/06* (2013.01); *H01M 4/587* (2013.01); *H01M 4/623* (2013.01); *H01M 10/052* (2013.01); *B02C 13/22* (2013.01); *C08K 2201/001* (2013.01)

(58) Field of Classification Search
  CPC ........ H01M 4/58; H01M 4/583; H01M 4/587; H01M 4/623; H01M 10/052; C08K 3/04; C08K 3/06; C08K 2201/001; C08F 14/26; B02C 13/22; B02C 21/00
  See application file for complete search history.

(56) References Cited

U.S. PATENT DOCUMENTS

| | | | | |
|---|---|---|---|---|
| 2013/0181676 A1* | 7/2013 | Kourtakis | ............. | H01M 4/362 429/211 |
| 2015/0061176 A1* | 3/2015 | Bruckner | ............... | H01M 4/623 264/105 |
| 2016/0248087 A1* | 8/2016 | Kim | ........................ | H01M 4/625 |
| 2018/0076446 A1* | 3/2018 | Glock | .................. | H01M 4/1391 |
| 2019/0123377 A1* | 4/2019 | Yang | ..................... | H01M 4/136 |
| 2019/0280289 A1* | 9/2019 | Zhang | ................... | H01M 4/625 |
| 2020/0220169 A1* | 7/2020 | Kim | ....................... | H01M 4/5815 |
| 2020/0350560 A1* | 11/2020 | Korzhenko | ......... | H01M 4/5815 |
| 2021/0143407 A1* | 5/2021 | Cho | ....................... | H01M 4/625 |

FOREIGN PATENT DOCUMENTS

| | | | | |
|---|---|---|---|---|
| JP | 2005289787 A | * | 10/2005 | |
| JP | 2010232085 A | * | 10/2010 | |
| WO | WO-2009114314 A2 | * | 9/2009 | .......... H01M 10/052 |

OTHER PUBLICATIONS

Li et al. ("Effects of electrolyte concentration and synthesis methods of sulfur/carbon composites on the electrochemical erformance in lithium-sulfur batteries," RSC Adv., 2015, 5, 54293-54300) (Year: 2015).*

Wagner, N., et al; "Lithium-sulfur batteries: New developments and findings"; Materials Colloquium 2018: Efficient energy conversion and storage, DLR Publication; Dec. 4, 2018; Article Accessed: Aug. 18, 2020, German Aerospace Center; 30 Pages.

* cited by examiner

METHOD FOR PRODUCING A HOMOGENIZED MIXTURE OF CARBON, SULFUR, AND PTFE

TECHNICAL FIELD

The invention relates to a method and a device for carrying out such a method according to the preamble of the product claim.

BACKGROUND

Li-sulfur batteries are currently considered to be a promising option for being able to cover the increasing demand of significantly more powerful batteries, see, for example, the DLR publication "Lithium-sulfur batteries: New developments and findings, N. Wagner, M. Schwan, B. Sievert, B. Milow, F. Warth, Apr. 12, 2018, Materials Colloquium 2018", accessed on 18.08.2020 from the server of the German Aerospace Center, which is known as DLR.

Li—S cathodes are required for such Li—S batteries.

The conventional production of such cathodes takes place by mixing the active materials, a conductive material, and a binder, with a solvent in order to prepare a slurry. This paste is applied to a carrier foil. After the coating, the carrier foil has to be dried. This is an energy-intensive step and is considered to be a "bottleneck" in the production. In addition, the solvent for the cathode preparation is harmful to the environment.

For this reason, the production according to a so-called "powder to roll" process was developed. The process is characterized in that, to begin with, a powdery mixture of sulfur (S) and carbon is evenly mixed with a suitable binder and is then calendered. The powder is thus rolled out into a textile-like film. This film can then be laminated onto a metal foil, mostly an aluminum foil, by means of rolling. An Li—S cathode of the required shape can thus be produced by means of rolling up or folding. In the case of the existing method, the starting materials, sulfur as active material and carbon as conductive addition, are dry-mixed with one another and are ground in a mill. The mixture is then placed into a furnace, so that the sulfur melts and is absorbed into the pores of the carbon. Carbon-sulfur agglomerates, which have to be ground again, are created thereby. In the next step, the powder is dry-mixed with PTFE as binder and is ground again.

In order to be able to produce cathodes of particularly high quality by means of this method, it is extremely important that the starting materials are distributed in the particle collective as homogenously as possible.

The current, dry mixing cannot be performed continuously, but only in individual batches.

SUMMARY

In view of this, the invention has taken on the task of developing a method, by means of which more homogenous mixtures can be produced continuously and with fewer process steps than with the help of the currently used technology.

This problem is solved by means of a method comprising the features of the claims.

It is a method for producing a homogenized mixture of carbon, sulfur, and PTFE.

The method is characterized in that the sulfur is liquefied, and the liquid sulfur is then ground for the first time together with the carbon or the carbon particles, respectively. This leads to a very even distribution of the sulfur and of the carbon. The liquid sulfur is thereby absorbed by the pores of the carbon particles, which can be accessed from the surface. The absorption is intensified by means of the grinding process, because fresh areas are exposed again and again, at which the carbon particles can absorb liquid sulfur. The sulfur forms a composite or composite particle, respectively, with the carbon, that is, a bond of carbon particles, mostly of powdery nature, with sulfur, which has penetrated into the pores of the respective carbon particle. Due to the grinding process, which runs simultaneously with said penetration into the pores, the individual composite particles remain separated and do not clump in this phase.

Particulate PTFE, which is preferably present in powdery form, is subsequently added as a solid.

The mixture of the composite particles and the PTFE particles is now ground a second time.

The second grinding serves for the intensive mixing or homogenization, respectively, of the particles of the total mixture with simultaneous comminution of all agglomerates, which may have resulted in the course of the melting. The very intensive swirling of the particles of the mixtures simultaneously has the effect that the particles cool down quickly and their tendency to form new agglomerations then decreases significantly or comes to a complete halt.

The carbon particles, which consist of a solid, are ideally used in the form of soot particles. Soot particles consist of carbon comprising an extremely large free surface and are thus particularly well suited for forming a composite with the sulfur.

It is particularly preferred when the liquid sulfur is guided into the first mill via an injector.

Until it is ground with the carbon particles for the first time, the liquid sulfur is ideally controlled in a temperature range of between 110° C. and 220° C. Due to the fact that the viscosity of liquid sulfur displays a significant temperature dependence, the sulfur should be subjected to a temperature control, in order to essentially always reach into the mill or the first mill, respectively, with the same viscosity, so that a reproducible result is created there.

This method could optionally also be carried out only in one mill. For this purpose, carbon and PTFE are supplied in a dosed manner, and the sulfur via the injector system, which is noted purely for the sake of completeness.

It is particularly favorable when the injector is operated at overpressure by means of nitrogen. Due to the overpressure, a directed and sufficiently quick flow sets in, which safely introduces the liquid sulfur into the mill, without it depositing excessively on the inner walls of the piping feeding the first mill, and is then no longer available for the fine, even mixing with the carbon. Nitrogen is a preferred injection gas thereby, because compared to carbon and sulfur, nitrogen is inert and is essentially not toxic.

Ideally, the temperature control of the injection gas is used to support the temperature control of the sulfur. It is ensured that the injection gas is heated up such that the sulfur remains liquid during the transport in the nitrogen (other inert gases would be conceivable), does not crystallize, and ideally reaches the grinding region, in which it is ground with the carbon particles, with a temperature, which lies in the above-mentioned temperature range.

It has proven to be particularly favorable when, following the grinding of the carbon particles with the sulfur, the injection gas is separated from the carbon-sulfur composite and is discharged. Immediately following the first grinding, a significantly cooler ambience is thus created, in which the present goal of cooling down the particles without further clumping can be reached significantly more quickly. In general, it can be said that it is favorable when the temperature of the carbon-sulfur composite falls after the common, first grinding.

It is particularly favorable when the first grinding takes place in an impact mill and in particular in a pin mill. In an impact mill and in particular in a pin mill, the grinding material is not compressed for a longer period of time or is not "traversed" and compressed by grinding bodies. Instead, the grinding effect is based on that the particles to be ground are centrifuged and smashed in the grinding chamber with high kinetic energy when they collide with one another or with the pins of the grinder with corresponding force. This prevents further clumping caused by the grinding.

It is particularly favorable when the second grinding also takes place in an impact mill and in particular in a pin mill. Even in the cases, in which this second grinding is more about a good mixing than a further comminution, the use of an impact mill and in particular of a pin mill has a particularly advantageous impact. This is so because the intensive swirling in the grinding chamber also has a very positive impact here, in a very good mixing with simultaneous quick cool-down.

The fact that the mixing is now simultaneously also associated with a grinding here is extremely favorable because the tendency of the composite particles, which are still hot initially, of clumping with one another is counteracted. As soon as such larger particles are created due to clumping, they are smashed again in a very short time by means of the grinding process.

It is particularly favorable when three separate dosages for sulfur, carbon particles, and PTFE are provided. They are preferably set such that the homogenized mixture contains 50 m % to 70 m % of sulfur, 25 m % to 40 m % of carbon particles (in particular in the form of soot), and 1 m % to 10 m % of PTFE.

For the most part, the homogenized mixture is created continuously while passing through the mills, and not batchwise, by means of several consecutive mill fillings. A batch-independent, consistent quality can be produced more easily in this way, in particular when one or several significant method parameters are monitored and updated.

It is particularly favorable when the first grinding is a hot gas grinding. This promotes the composite formation, thus the formation of the described carbon-sulfur bond, as part of the first grinding.

In the ideal case, the second grinding significantly or considerably serves to cool the end product, which is available after the completion of the method according to the invention. Due to the fact that the process is a grinding process, it is prevented that on the way to the cool-down, the product agglomerates in an undesirable manner into a temperature range, in which significant clumping does not take place any longer.

DETAILED DESCRIPTION

Figure 1:
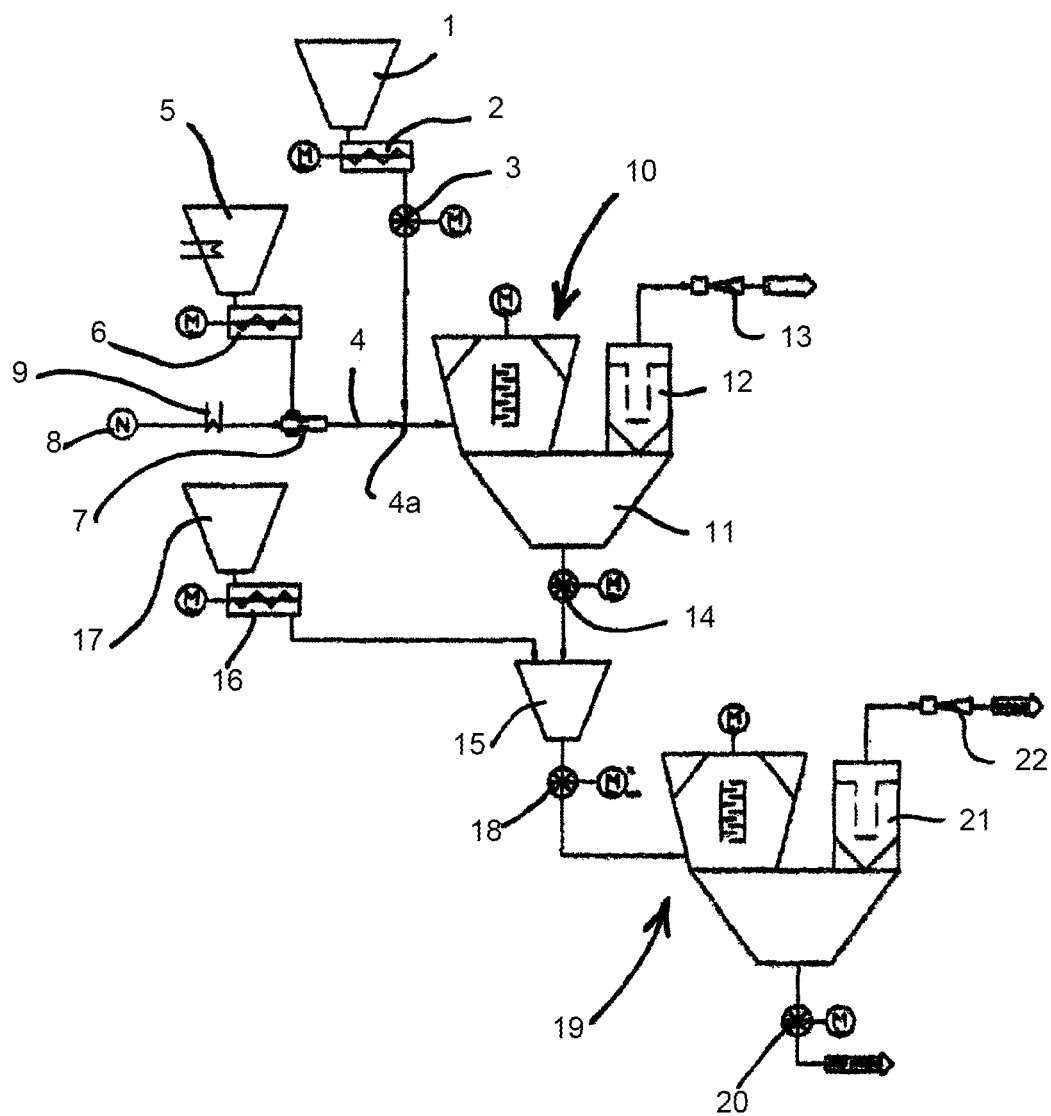
FIG. 1 shows the plant-related design, which a preferred exemplary embodiment of the method according to the invention requires.

FIG. 1 shows a plant for carrying out the method according to the invention, which, according to the invention, uses a 2-step grinding process. A 2-step grinding process has the large advantage that a formation of small clumps of the sulfur/soot composite, which cools down, is prevented. At the same time, the 2-step grinding process results in that the end product is cooled in the second mill or when passing through the mill a second time, respectively, should only a single mill be used. In this way, a fine homogenization with the PTFE powder can be ensured with the use of a 2-step grinding process. The plant is characterized in that it operates the process according to the invention as continuous process. Unlike in the past, it is not provided to work in a batchwise manner, for instance with batches, which are specified by the volume of a mill filling. This increases the quality. The otherwise typical quality fluctuations, which occur from batch to batch, no longer apply.

The homogenized mixture, which is produced by means of the method according to the invention, is a mixture of carbon, sulfur, and PTFE, whereby the latter is also known as polytetrafluoroethylene. The carbon is mostly used in the form of soot.

The carbon bunker or soot bunker 1, respectively, can be seen well in FIG. 1. From it, soot is gravimetrically dosed in via the dosing device or the dosing screw 2, respectively. The dosing is preferably set such that the soot share in the finished homogenized mixture is approximately 25 m % to 40 m %, i.e. mass percent. Via the cellular wheel sluice 3, the soot reaches all the way to the mill feed line 4, which will be described in more detail below, preferably under the influence of the force of gravity.

The bunker 5 can likewise be seen well in FIG. 1. Powdery sulfur reaches from the sulfur bunker, again preferably under the influence of the force of gravity, into the dosing device or the dosing screw 6, respectively. The dosing is preferably set such that the sulfur share in the finished homogenized mixture is approximately 50 m % to 70 m %. The dosing device or the dosing screw 6, respectively, is heated. For this purpose, the dosing screw is usually equipped with one or several, preferably temperature-controlled or temperature-regulated heating elements at the dosing tube. The heating elements are set to a certain temperature, so that the sulfur changes its state from powder to liquid during the dosing process due to the temperature influence. The sulfur thus leaves the dosing device in completely liquid state.

A precise dosing is important for a stable product quality of the later battery cell. In particular the temperature control or temperature regulation of the dosing tube thus has to be exact. This is so because the sulfur displays a particular melting-viscosity behavior. Sulfur has a melting point of around 119° C. When melting sulfur, a low-viscous liquid forms initially. In response to further heating, the viscosity increases until it reaches the maximum at 187° C. In response to further heating, the viscosity sinks again. To attain an exact dosing, the temperature of the sulfur thus has to be controlled carefully.

The sulfur reaches into an injector 7, preferably under the influence of the force of gravity.

The injector 7 is fed with heated-up, pressurized injector gas from a gas supply 8. For the most part, the injector gas is fed in in a preheated manner, with a temperature of 100° C. to 200° C.

Nitrogen is preferably used as injector gas. Nitrogen has the advantage that even under heat, it does not tend to undergo reactions with the sulfur to a noteworthy extent. However, a different inert gas could also be used instead. However, for reasons of process efficiency, nitrogen is clearly preferred.

As suggested in FIG. 1, a heating element 9, which controls the temperature of the injector gas accordingly, is provided upstream of the injector 7 for this purpose. The injector gas leaves the injector 7 via the mill feed line 4 and flows in the direction of the first mill. The temperature of the injector gas is thereby controlled such that the sulfur remains liquid in the injector gas during the transport, and does not crystallize out. The pressure of the injector gas is selected such that the sulfur is transported from the injector into the first mill 10. Before the injector gas, which is fraught with the sulfur, reaches the first mill, the soot is fed into the mill feed line 4 at the tube intersection 4a. Supported by the injector gas, the liquid sulfur and the soot now reach the first mill 10 or the grinding chamber thereof, respectively. The first mill 10 is typically an impact mill. Ideally, a so-called pin mill is used.

Figure 2:
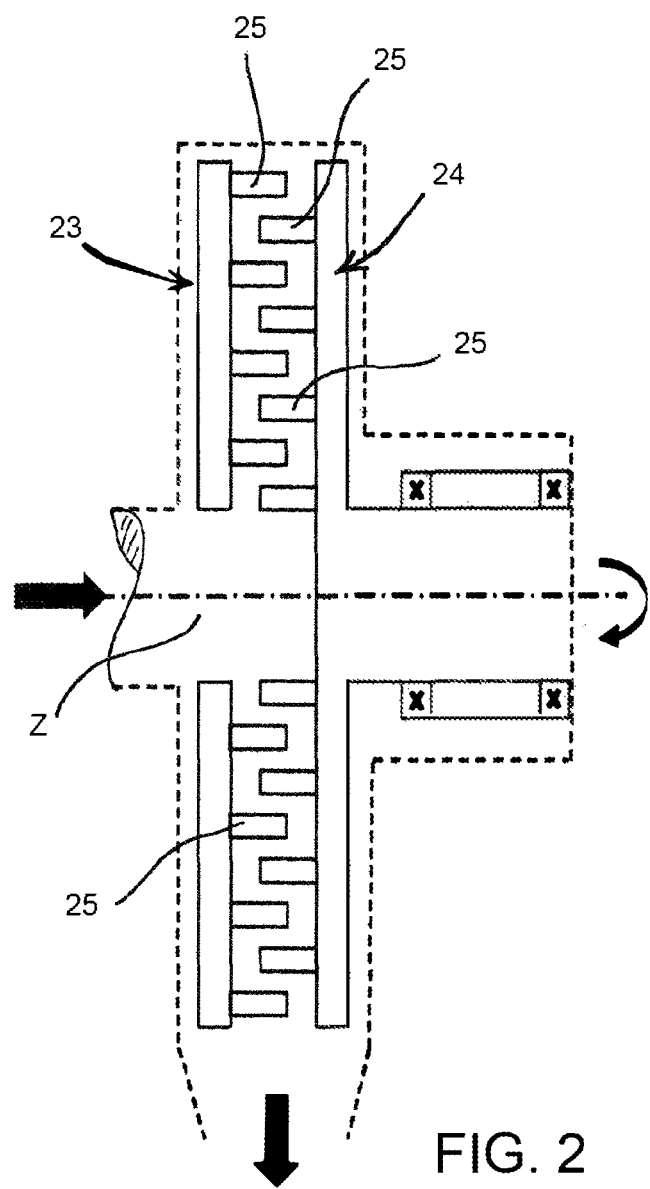
FIG. 2 illustrates the pin plates of a pin mill, which is preferably used here for the grinding.

In the case of a pin mill, grinding disks are used as grinding tools, which are equipped with pins, which are positioned at a distance from one another, as it is illustrated by FIG. 2 as preferred embodiment. As a rule, at least one stationary pin disk 23 and at least one rotating pin disk 24 are used, wherein pin disks, which rotate in opposite directions, are also conceivable, however. The material to be ground is fed mostly in the center Z, which is not pin-fitted, of the pin disks 23, 24 or preferably of the stationary pin disk, respectively. From there, it is flung to the outside by means of the centrifugal force and is then mostly also discharged to the outside. The grinding process thereby takes place due to the impact with the pins 25 and the mutual particle impact.

As a rule, the rotating pin disk is speed-controlled or speed-regulated. As a rules, the faster the pin disk rotates, the finer the grinding result.

The sulfur and the soot are finely distributed and mixed well by means of the grinding. Due to the fact that the grinding takes place in hot gas operation in the first mill 10, the liquid sulfur is absorbed by the pores of the soot. It forms a composite therewith in the above-described sense.

After the end of the first grinding, the composite of soot and sulfur falls into the bunker 11 below the mill.

As can be seen well on the basis of FIG. 1, the injector gas or the nitrogen, as a rule, respectively, is moved in a circle. The injector gas, of which there is a surplus after the first grinding, is purified by means of a filter 12 and is guided out of the grinding plant through an injector 13. It is then preferably added to the injector gas supply 8 or to the nitrogen supply again, respectively, which is not illustrated figuratively here. It should also be noted that the discharge of the injector gas can also be realized by means of a fan, which is not illustrated figuratively here.

The sulfur/soot composite falls out of the bunker 11 into a cellular wheel sluice 14, which is speed-regulated or speed-controlled, as a rule. From there, it is ejected into a storage container 15. Free-flowing PTFE from the PTFE bunker 17 is added in this storage container 15 via a dosing device or a dosing screw 16, respectively. The PTFE powder falls into the dosing device or the dosing screw 16, respectively, under the influence of the force of gravity. From there, it is conveyed into the storage container 15.

The soot/sulfur/PTFE mixture is guided continuously from the storage container 15 into a second impact mill 19 via a further speed-regulated or speed-controlled cellular wheel sluice 18. It also applies here that the impact mill 19 is preferably designed as pin mill. What has been described above applies analogously here.

However, no hot gas grinding takes place in this second impact mill. Instead, the soot/sulfur mixture with the PTFE is not only homogenized, but is also cooled down for the further processing by means of the grinding process. Due to the fact that the cool-down takes place during this second grinding step, which leads to an immediate splitting of sulfur clumps, which may possibly form during the cool-down, no coarse, hard sulfur clumps can be created during the cool-down process. In addition, the PTFE powder is present in an even and finally distributed manner.

The end product in the form of the homogenized mixture of carbon, sulfur, and PTFE is discharged via a further cellular wheel sluice 20. The excess process gas is filtered by the filter 21 and is discharged from the grinding plant by means of a further injector 22. In the alternative, a vacuum fan can also be used for the discharge.

The invention claimed is:

1. A method for producing a homogenized mixture of carbon, sulfur, and PTFE, comprising:
   liquefying sulfur into liquid sulfur,
   providing carbon in a form of carbon particles,
   combining the liquid sulfur with the carbon,
   introducing the combination of the liquid sulfur and the carbon into a mill,
   grinding the liquid sulfur together with the carbon for a first time via the mill, so that the liquid sulfur is absorbed by pores of the carbon particles and forms a powdery composite with the carbon particles, and
   adding PTFE with the powdery composite to form a mixture, and then grinding for a second time the mixture to homogenize the mixture, wherein said grinding for the second time is performed in the mill or in another mill,
   wherein the step of liquefying sulfur into liquid sulfur includes feeding the liquid sulfur to an injector and guiding the liquid sulfur via a feed line from the injector towards the mill, and
   wherein the step of combining the liquid sulfur with the carbon includes feeding the carbon into the feed line to form the combination of the liquid sulfur and the carbon.

2. The method according to claim 1, wherein the carbon particles are soot.

3. The method according to claim 1, further comprising:
   controlling a temperature of the liquid sulfur in a temperature range of between 119° C. and 220° C. until the liquid sulfur is ground with the carbon particles.

4. The method according to claim 3, wherein the temperature of the liquid sulfur is controlled between 119° C. and 190° C.

5. The method according to claim 1, further comprising:
   operating the injector at overpressure with an injection gas.

6. The method according to claim 5 wherein the injection gas is heated up such that the liquid sulfur remains liquid during transport in the injection gas, does not crystallize, and reaches a grinding region of the mill with a temperature between 119° C. and 220° C.

7. The method according to claim 5, wherein following the grinding of the carbon particles with the liquid sulfur, the injection gas is separated from the composite and is discharged.

8. The method according to claim 5 wherein the injection gas is nitrogen.

9. The method according to claim 1, wherein a temperature of the powdery composite falls after the grinding for said first time.

10. The method according to claim 1, wherein the mill involved in the grinding for said first time is an impact mill, and wherein the grinding for said second time takes place in said impact mill or in another impact mill.

11. The method according to claim 10, wherein the impact mill is a pin mill, or the impact mill and the another impact mill are pin mills.

12. The method according to claim 1, further comprising:
setting a dosage for the sulfur, setting a dosage for the carbon particles, and setting a dosage for the PTFE such that the homogenized mixture contains 50 m % to 70 m % of sulfur, 25 m % to 40 m % of carbon particles, and 1 m % to 10 m % of PTFE.

13. The method according to claim 1, wherein the homogenized mixture is created continuously through the mill for the first time grinding and the second time grinding or through the mill for the first time grinding and said another mill for the second time grinding, and not batchwise, by means of several consecutive mill fillings.

14. The method according to claim 1, wherein the grinding for said first time is performed in a hot gas operation.

15. The method according to claim 1, wherein the grinding for said second time serves to cool the homogenized mixture.

16. The method according to claim 1, further comprising:
providing an injection gas from a gas supply,
controlling a temperature of the injection gas via a heating element, and
feeding the injection gas to the injector.

17. The method according to claim 16, further comprising:
after the step of grinding for the first time, purifying the injection gas via a filter and adding the purified injection gas to the gas supply.

18. The method according to claim 1, wherein the step of liquefying sulfur into liquid sulfur is performed by a dosing device having one or more heating elements.

19. The method according to claim 1, further comprising:
discharging the homogenized mixture via a sluice or a vacuum fan.

20. A system for producing a homogenized mixture of carbon, sulfur, and PTFE, comprising:
a first dosing screw having at least one heating element, which liquefies sulfur into liquid sulfur;
an injector receiving the liquid sulfur;
a second dosing screw providing carbon in a form of carbon particles;
a feed line receiving the liquid sulfur from the injector and the carbon from the second dosing screw;
a first mill connected to the feed line and grinding the liquid sulfur together with the carbon for a first time, so that the liquid sulfur is absorbed by pores of the carbon particles and forms a powdery composite with the carbon particles;
a third dosing screw providing PTFE, which is added with the powdery composite in a storage container to form a mixture; and
a second mill grinding for a second time the mixture to homogenize the mixture, wherein the first and second mills are impact mills arranged one behind the other in a transport direction of the mixture.

* * * * *